United States Patent
Choi et al.

(10) Patent No.: US 9,423,626 B2
(45) Date of Patent: Aug. 23, 2016

(54) MULTI-VIEW 3D IMAGE DISPLAY APPARATUS AND METHOD

(75) Inventors: Kyu-hwan Choi, Yongin-si (KR); Hong-seok Lee, Seongnam-si (KR); Hoon Song, Yongin-si (KR); Yoon-sun Choi, Yongin-si (KR); Jung-mok Bae, Seoul (KR); Eok-su Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 13/485,859

(22) Filed: May 31, 2012

(65) Prior Publication Data

US 2012/0307357 A1  Dec. 6, 2012

(30) Foreign Application Priority Data

Jun. 1, 2011 (KR) .......................... 10-2011-0053001

(51) Int. Cl.
*G02B 27/22* (2006.01)
*G02B 26/00* (2006.01)
*H04N 13/04* (2006.01)

(52) U.S. Cl.
CPC .......... *G02B 27/2292* (2013.01); *G02B 26/005* (2013.01); *H04N 13/042* (2013.01)

(58) Field of Classification Search
CPC .... G02B 27/22; G02B 27/225; G02B 26/005; G02B 7/10; G02B 26/004; G02B 3/14; G02B 1/06; H04N 13/042
USPC ...................................................... 359/462
See application file for complete search history.

(56) References Cited

U.S. PATENT DOCUMENTS

| 7,515,340 | B1 | 4/2009 | Shiu et al. | |
|---|---|---|---|---|
| 7,775,666 | B2 * | 8/2010 | Kubara | H04N 13/0406 348/51 |
| 2006/0158729 | A1 * | 7/2006 | Vissenberg et al. | 359/462 |
| 2008/0198292 | A1 | 8/2008 | Marra et al. | |
| 2008/0316302 | A1 * | 12/2008 | Vos et al. | 348/51 |
| 2010/0195190 | A1 * | 8/2010 | Ishioka et al. | 359/316 |
| 2010/0231783 | A1 * | 9/2010 | Bueler et al. | 348/347 |
| 2011/0063289 | A1 * | 3/2011 | Gantz | 345/419 |
| 2011/0096071 | A1 * | 4/2011 | Okamoto et al. | 345/419 |

FOREIGN PATENT DOCUMENTS

| JP | 08-186845 | 7/1996 |
|---|---|---|
| JP | 2000-175220 A | 6/2000 |
| JP | 2000-224614 A | 8/2000 |
| JP | 2006-113182 A | 4/2006 |
| KR | 10-2003-0045706 A | 6/2003 |
| KR | 10-2003-0087310 A | 11/2003 |
| KR | 10-2005-0012513 A | 2/2005 |
| WO | WO 2009/050273 A3 | 4/2009 |

* cited by examiner

*Primary Examiner* — Jade R Chwasz
(74) *Attorney, Agent, or Firm* — NSIP Law (57) ABSTRACT

A three-dimensional (3D) image display apparatus and method are provided. The 3D image display apparatus includes an image generating unit configured to generate an image, an active optical device configured to change a propagation path of light containing the generated image, and provide the generated image to multiple viewpoints that are located along a first direction parallel to the image generating unit, and a varifocal lens configured to vary a focal position of the generated image along a second direction away from the image generating unit.

17 Claims, 8 Drawing Sheets

MULTI-VIEW 3D IMAGE DISPLAY APPARATUS AND METHOD

CROSS-REFERENCE TO RELATED APPLICATIONS

This application claims the benefit under 35 U.S.C. §119 (a) of Korean Patent Application No. 10-2011-0053001, filed on Jun. 1, 2011, in the Korean Intellectual Property Office, the entire disclosure of which is incorporated herein by reference for all purposes.

BACKGROUND

1. Field

The following description relates to a multi-view three-dimensional (3D) image display apparatus and method.

2. Description of the Related Art

Recently, demands for three-dimensional (3D) image displays that provide stereoscopic images have significantly increased in various fields such as games, advertisements, medical imaging, education, and military applications. Furthermore, with increasing popularity of high-resolution TVs, 3D TVs that allow viewers to see 3D images are gradually becoming more widely used in commercial applications. To cope with this trend, various 3D image display techniques have been proposed. Commercially used 3D image displays employ binocular parallax between two eyes to provide left and right eye images to a viewer's left and right eyes, respectively, so that the viewer may perceive depth. 3D image displays are classified into eyeglass-type 3D image displays, which use a special type of glasses, and non-eyeglass-type 3D image displays, which do not require glasses.

However, a 3D image display providing only two views, such as left-eye and right-eye images, may be limited in providing a natural sense of depth if a change in viewpoint due to a viewer's movement is not reflected. Thus, multi-view 3D image displays capable of providing multiple views, and, for example, 3D images having different viewpoints, to multiple viewing zones have been proposed in order to provide natural motion parallax.

However, crosstalk may occur between different viewing zones and create a non-stereoscopic or inverse stereoscopic region between the viewing zones. Furthermore, increasing the number of views may achieve natural motion parallax but degrade a resolution of each view. For example, a 3D image display using a projection optical system may require the inclusion of an increasing number of projection optical systems in order to increase the number of views. The increased number of projection optical systems may cause the overall system to become bulky. Because a multi-view 3D image display may provide only binocular parallax, a 3D image may not be able to be viewed with one eye.

SUMMARY

In one general aspect, there is provided a three-dimensional (3D) image display apparatus, including an image generating unit configured to generate an image, an active optical device configured to change a propagation path of light containing the generated image, and provide the generated image to multiple viewpoints that are located along a first direction parallel to the image generating unit, and a varifocal lens configured to vary a focal position of the generated image along a second direction away from the image generating unit.

A general aspect of the apparatus may further provide that the varifocal lens is disposed between the image generating unit and the active optical device.

A general aspect of the apparatus may further provide that the active optical device is disposed between the image generating unit and the varifocal lens.

A general aspect of the apparatus may further provide that the active optical device includes an electrowetting prism having a refracting surface whose slope changes according to application of a voltage.

A general aspect of the apparatus may further provide that the active optical device includes an optical plate configured to control a direction in which light is refracted according to a rotation angle of the optical plate.

A general aspect of the apparatus may further provide that the rotation angle of the optical plate is adjusted in an electro-mechanical manner.

A general aspect of the apparatus may further provide that the varifocal lens includes a liquid lens configured to control a shape of a lens surface according to electrical control.

A general aspect of the apparatus may further provide that the varifocal lens includes an optical lens configured to perform parallel movement along the second direction.

A general aspect of the apparatus may further provide that the image generating unit includes one of a Liquid Crystal Display (LCD), a Ferroelectric Liquid Crystal Display (FLCD), a Digital Micromirror Device (DMD), a Liquid Crystal on Silicon (LCOS), a Spatial Light Modulator (SLM), a Plasma Display Panel (PDP), a Cathode Ray Tube (CRT), a Light Emitting Diode (LED), and an Organic Light Emitting Diode (OLED).

A general aspect of the apparatus may further provide that the image is one of a plurality of images having different viewpoints generated in a time sequential manner by the image generating unit.

A general aspect of the apparatus may further provide that the active optical device is further configured to refract light containing the generated images having different viewpoints at different angles in synchronization with the image generating unit.

A general aspect of the apparatus may further provide an eye-tracking sensor configured to detect a viewing position.

A general aspect of the apparatus may further provide that the varifocal lens is further configured to vary the focal position according to the detected viewing position.

In another general aspect, there is provided a three-dimensional (3D) display method, including generating, in an image generating unit, a plurality of images having different viewpoints that will be provided to multiple viewpoints located along a first direction parallel to the image generating unit, providing the generated images having different viewpoints to the multiple viewpoints corresponding thereto, and adjusting focal positions of the generated images along a second direction away from the image generating unit.

The general aspect of the method may further provide that the providing of the generated images includes refracting light containing the generated images having different viewpoints at different angles.

The general aspect of the method may further provide that the refracting of the light includes changing a slope of a refracting surface of an electrowetting prism according to application of a voltage.

The general aspect of the method may further provide that the refracting of the light includes controlling a direction in which the light is refracted using an optical plate, the controlling of the light refracting direction including adjusting a rotation angle of the optical plate.

The general aspect of the method may further provide that the adjusting of the focal positions includes controlling a shape of a lens surface with a liquid lens according to electrical control.

The general aspect of the method may further provide that the adjusting of the focal positions includes performing parallel movement with an optical lens along the second direction.

The general aspect of the method may further provide that the adjusting of the focal positions includes detecting a viewing position via eye-tracking, and controlling the focal positions according to the detected viewing position.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. In addition, descriptions of well-known functions and constructions may be omitted for increased clarity and conciseness.

Figure 1:
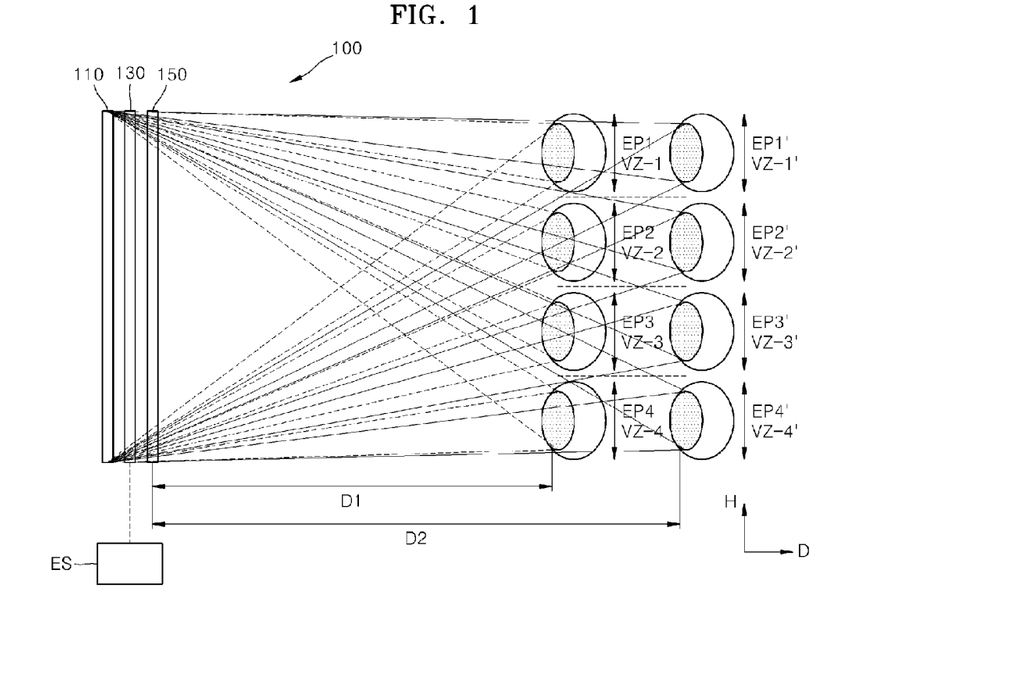
FIG. 1 illustrates a schematic construction of a three-dimensional (3D) image display apparatus according to an example embodiment and optical paths in which multi-view images are created.

FIG. 1 illustrates a schematic construction of a three-dimensional (3D) image display apparatus 100 according to an example embodiment and optical paths in which multi-view images are created. Referring to FIG. 1, the 3D image display apparatus 100 includes an image generating unit 110, a varifocal lens 130, and an active optical device 150.

The image generating unit 110 may include one of various types of display panels, such as a Liquid Crystal Display (LCD), a Ferroelectric Liquid Crystal Display (FLCD), a Digital Micromirror Device (DMD), a Liquid Crystal on Silicon (LCOS), a Spatial Light Modulator (SLM), a Plasma Display Panel (PDP), a Cathode Ray Tube (CRT), a Light Emitting Diode (LED), and an Organic Light Emitting Diode (OLED). When the image generating unit 110 includes a light-receiving display panel such as an LCD, an FLCD, a DMD, an LCOS, or an SLM, the 3D image display apparatus 100 may further include a backlight unit (not shown) to provide light required to produce images.

The image generating unit 110 generates images having different viewpoints in a time sequential way. For example, the image generating unit 110 may time sequentially produce images corresponding to multiple viewpoints that are located along a first direction H parallel to image generating unit 110.

The varifocal lens 130 and the active optical device 150 are constructed to provide light containing an image output from the image generating unit 110 to a corresponding viewing zone. The 3D image display apparatus 100 employs the varifocal lens 130 and the active optical device 150 together to increase a range of a viewing zone where 3D images may be viewed.

The active optical device 150 changes propagation paths of light containing images output from the image generating unit 110 and provides the images to multiple viewpoints that are located along the first direction H parallel to the image generating unit 110. The active optical device 150 may be driven to refract light toward a corresponding viewpoint in synchronization with time-sequential driving of the image generating unit 110 producing images of different viewpoints. When a plurality of viewpoints is provided to one eye, that is, super multi view points are provided, by increasing the number of viewpoints, it may be possible to perceive 3-dimensional images with one eye. A structure of the active optical device 150 will be described in greater detail in a following portion of this description.

The varifocal lens 130 varies a position at which an image is focused along a second direction D away from the image generating unit 110. For example, as shown in FIG. 1, the focal position may be changed to a distance D1 or D2.

In order to vary the focal position of the varifocal lens 130, the 3D image display apparatus 100 of an example embodiment further includes an eye-tracking sensor ES that detects a viewing position. The varifocal lens 130 may be controlled to change a focal length according to information detected by the eye-tracking sensor ES. A detailed structure of the varifocal lens 130 will be described in greater detail in a following portion of this description.

Due to such operations of the varifocal lens 130 and the active optical device 150 in the example embodiment, 3D viewing zones VZ-1, VZ-2, VZ-3, and VZ-4 are provided to viewers at viewing positions EP1, EP2, EP3, and EP4 at the distance D1. Furthermore, viewing zones VZ-1', VZ-2', VZ-3', and VZ-4' are provided to viewers at viewing positions EP1', EP2', EP3', and EP4' at the distance D2 in the example embodiment. Hereinafter, the structures of the active optical device 150 and the varifocal lens 130 according to example embodiments are further described.

Figure 2A:
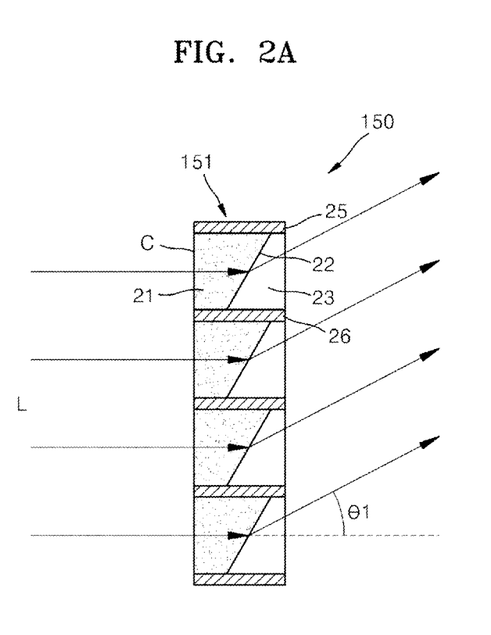
FIGS. 2A through 2C illustrate an example of an active optical device for use in the 3D image display apparatus of FIG. 1 and optical paths in which incident light is refracted in different directions.
Figure 2B:
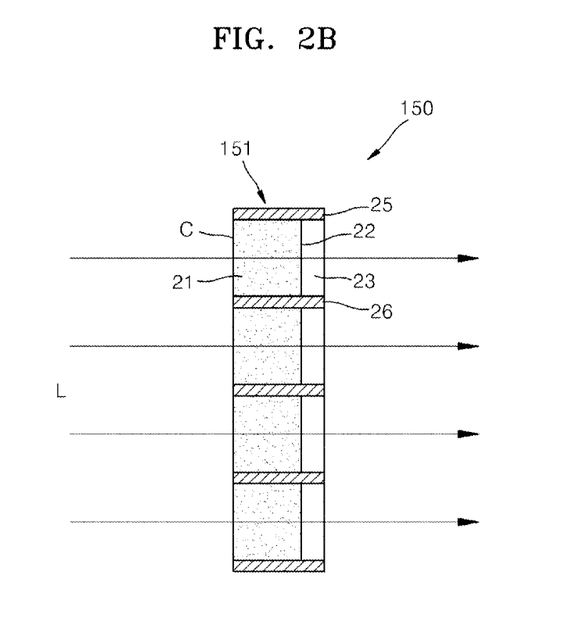
Figure 2C:
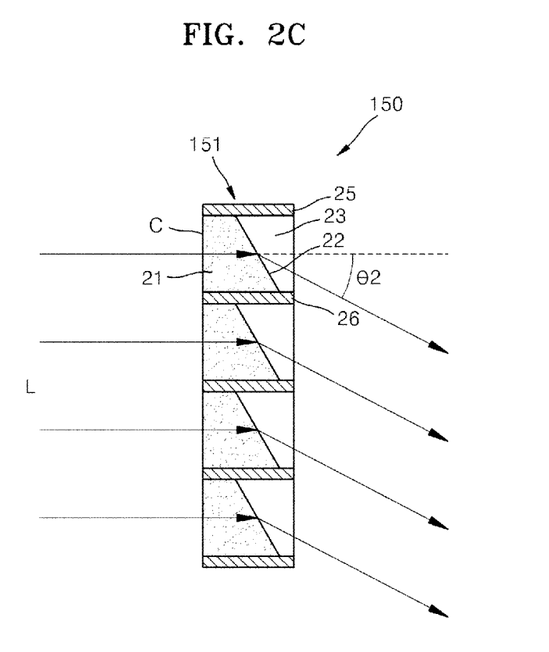

FIGS. 2A through 2C illustrate the active optical device 150 for use in the 3D image display apparatus 100 of FIG. 1 according to an example embodiment and optical paths in which incident light is refracted in different directions.

The active optical device 150 includes an array of electrowetting prisms 151. The electrowetting prism 151 may control a direction in which light exits by adjusting a slope of a refracting surface 22 according to an electrical signal. That is, the direction of light propagation is controlled by adjusting the slope of the refracting surface 22, thereby implementing multi-views. The electrowetting prism 151 has a cell C filled with a polar liquid 21 such as water and a non-polar liquid 23 such as oil. The cell C has first and second electrodes 25 and 26 disposed along two inner sidewalls. An interface between the polar and non-polar liquids 21 and 23 acts as the refracting surface 22. Upon application of a voltage to the first or second electrode 25, 26, a force that pulls polar molecules in the polar liquid 21 toward the electrode to which the voltage is applied is created to change a surface tension between the polar liquid 21 and the respective first or second electrode 25, 26, thereby changing the slope of the refracting surface 22. In this case, when water and metal directly contact to each other, they exchange electrons to split the water into hydrogen and oxygen atoms. Thus, in order to prevent the polar liquid 21 from directly contacting the first and second electrodes 25, 26, a dielectric layer (not shown) is coated on surfaces of the first and second electrodes 25 and 26. As the slope of the refracting surface 22 varies, the direction in which light exits changes accordingly. In this way, by adjusting application of a voltage to the first and second electrodes 25, 26 and a magnitude of the applied voltage, the direction in which light exits may be controlled.

Referring to FIG. 2A, when the electrowetting prism 151 is electrically controlled to incline the refracting surface 22 at a predetermined angle, light L is refracted upward at an angle $\theta 1$ with respect to a direction in which the light L is incident as the light L passes through the refracting surface 22 before being transmitted through the electrowetting prism 151.

Referring to FIG. 2B, when the refracting surface 22 of the electrowetting prism 151 is not inclined, light L passes through the electrowetting prism 151 without a change in its propagation path.

Referring to FIG. 2C, when the electrowetting prism 151 is electrically controlled to incline the refracting surface 22 at another predetermined angle, light L is refracted downward at an angle $\theta 2$ with respect to a direction in which the light L is incident as the light L passes through the refracting surface 22 before being transmitted through the electrowetting prism 151.

The electrowetting prism 151 may be driven in synchronization with an output of an image generated by the image generating unit 110. For example, when an image of a first viewpoint is output, the electrowetting prism 151 may have the refracting surface 22 inclined as shown in FIG. 2A so as to refract upward light from the refracting surface 22 by the angle $\theta 1$. When the image generating unit 110 outputs an image of a second viewpoint, the electrowetting prism 151 may be driven without the refracting surface 22 being inclined as shown in FIG. 2B. When the image generating unit 110 outputs an image of a third viewpoint, the electrowetting prism 151 may have the refracting surface 22 inclined as shown in FIG. 2C so as to refract downward light from the refracting surface 22 by the angle $\theta 2$.

Although the active optical device 150 adjusts the light exit direction using electrowetting principles, it is not limited thereto. For example, when an image is created using polarized light, the light exit direction may be adjusted using liquid crystals (LCs). An alignment of LC molecules may be changed depending on a magnitude of an electric field created by a voltage applied to an electrode, thereby resulting in a change in a refractive index of the LCs.

Furthermore, while the active optical device 150 includes of an array of four electrowetting prisms 151, it is not limited thereto as long as it includes one electrowetting prism 151.

Although FIGS. 2A through 2C illustrate images having three viewpoints, images having more than three viewpoints may be displayed depending on a driving speed of the electrowetting prism 151 and the slope of the refracting surface 22. Further, a distance between the viewpoints may be adjusted. When images having a plurality of viewpoints are provided to one eye, super multi-view images may be provided.

Figure 3A:
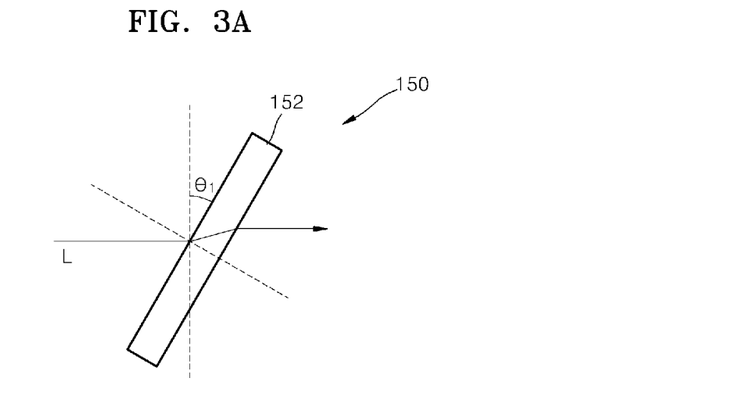
FIGS. 3A through 3C illustrate another example of an active optical device for use in the 3D image display apparatus of FIG. 1 and optical paths in which incident light is refracted in different directions.
Figure 3B:
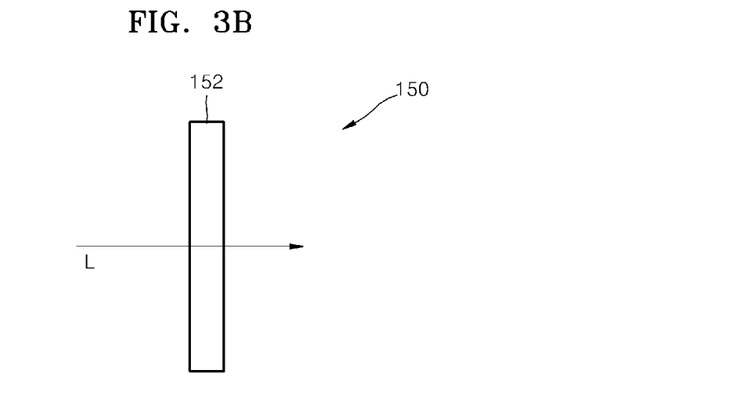
Figure 3C:
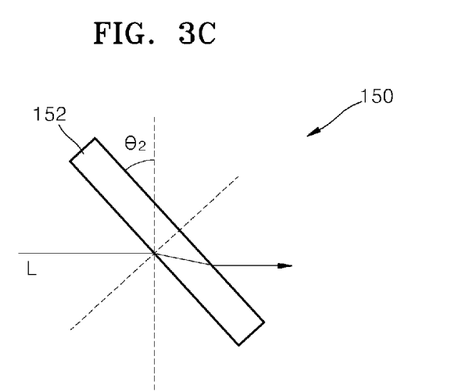

FIGS. 3A through 3C illustrate the active optical device 150 for use in the 3D image display apparatus 100 of FIG. 1 according to another example embodiment and optical paths in which incident light is refracted in different directions.

Referring to FIGS. 3A through 3C, the active optical device 150 includes an optical plate 152 rotating at a high speed. The optical plate 152 may be formed of a material having a refractive index different than that of an adjacent layer, and may change a propagation path of light. For example, the optical plate 152 may be formed of a light-transmissive material having a refractive index different than that of air. The optical plate 152 may be rotated by a desired angle in an electro-mechanical manner. The propagation path of light may be changed depending on the rotation angle of the optical plate 152. For example, in cases in which the optical plate 152 is inclined at an angle $\theta 1$ to the right from a line perpendicular to the propagation direction of light as shown in FIG. 3A, is not rotated as shown in FIG. 3B, and is inclined at an angle $\theta 2$ to the left from the same line as shown in FIG. 3C, light that has passed through the optical plate 152 propagates toward different directions.

The optical plate 152 may be driven in synchronization with an output of an image generated by the image generating unit 110. For example, when an image having a first viewpoint is output from the image generating unit 110, the optical plate 50 may be rotated in the same direction as shown in FIG. 3A. When an image having a second viewpoint is output from the image generating unit 110, the optical plate 152 may not be rotated as shown in FIG. 3B. When an image having a third viewpoint is output from the image generating unit 110, the optical plate 152 may be rotated in the same direction as shown in FIG. 3C.

Although the active optical device 150 includes one optical plate 152, it may include an array of a plurality of optical plates 152.

Although FIGS. 3A through 3C illustrate images having three viewpoints, images having more than three viewpoints may be displayed depending on a driving speed of the optical plate 152 and the rotation angle of the optical plate 152. Further, a distance between the viewpoints may be adjusted. When images having a plurality of viewpoints are provided to one eye, super multi-views may be provided.

Figure 4:
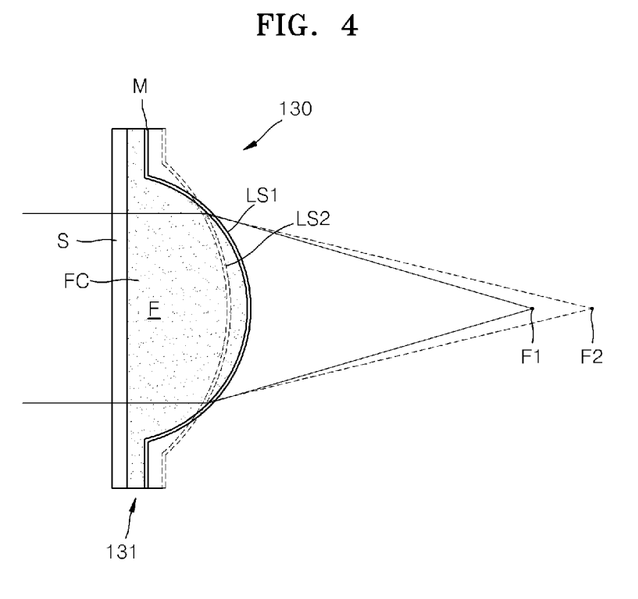
FIG. 4 illustrates an example of a varifocal lens for use in the 3D image display apparatus of FIG. 1 and optical paths in which a focal position is varied depending on a change in the shape of a lens surface.

FIG. 4 illustrates the varifocal lens 130 for use in the 3D image display apparatus 100 of FIG. 1 according to an example embodiment and optical paths in which a focal position is varied depending on a change in a shape of a lens surface.

The varifocal lens 130 illustrated in FIG. 4 according to an example embodiment includes a liquid lens 131 that controls a shape of a lens surface according to electrical control. The liquid lens 131 includes a light-transmissive substrate S, an optical membrane M forming the lens surface, and a fluid chamber (FC) disposed between the light-transmissive substrate S and the optical membrane M, the FC being filled with an optical fluid F. The liquid lens 131 further has a controller (not shown) for controlling a flow of the optical fluid F. The optical membrane M may be formed of a transparent elastic material. The shape of the lens surface formed by the optical membrane M may vary depending on the flow of the optical fluid F, thereby changing a focal length. For example, when the lens surface formed by the optical membrane M has a shape as a first lens surface LS1, the varifocal lens 130 may be focused on a position F1. When the lens surface formed by the optical membrane M has a shape as a second lens surface LS2, the varifocal lens 130 may be focused on a position F2. Such a change in a focal position may be accomplished by controlling the flow of the optical fluid F according to information obtained from the eye-tracking sensor (ES), which detects a viewing position.

Figure 5:
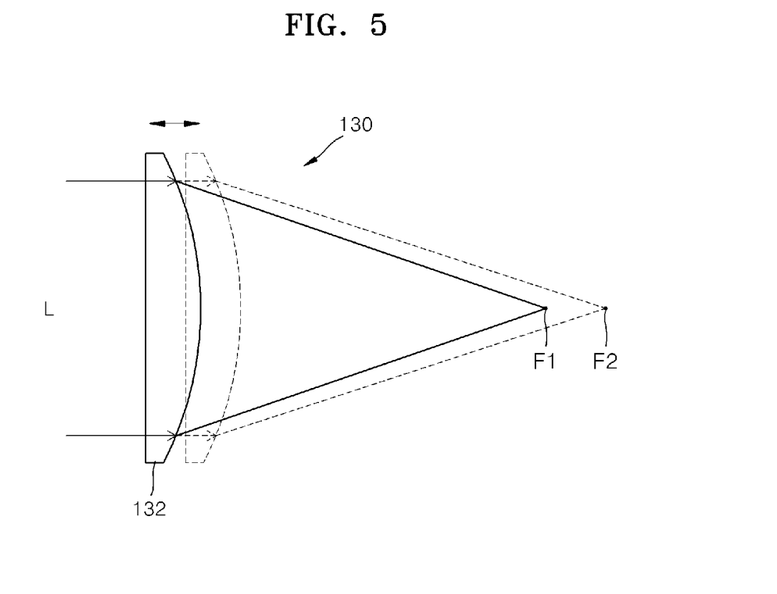
FIG. 5 illustrates another example of a varifocal lens for use in the 3D image display apparatus of FIG. 1 and optical paths in which a focal position is varied depending on parallel movement of the varifocal lens.

FIG. 5 illustrates the varifocal lens 130 for use in the 3D image display apparatus 100 of FIG. 1 according to another example embodiment and optical paths in which a focal position is varied depending on parallel movement of the varifocal lens 130.

The varifocal lens 130 illustrated in FIG. 5 according to another example embodiment includes an optical lens 132 whose parallel movement is controlled by a driver (not shown). For example, the varifocal lens 130 may be focused on a position F1 or F2 as shown in FIG. 5. Such a change in the focal position may be accomplished by controlling a distance by which the optical lens 132 moves according to information obtained from the eye-tracking sensor (ES), which detects a viewing position.

Figure 6:
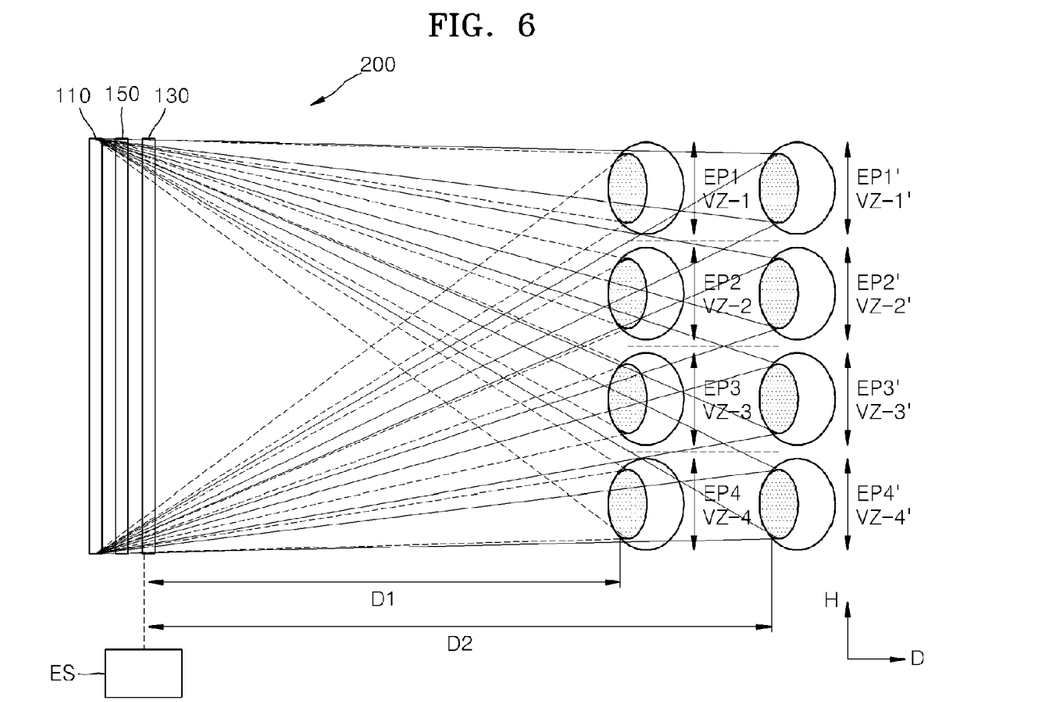
FIG. 6 illustrates a schematic construction of a 3D image display apparatus according to another example embodiment and optical paths in which multi-view images are created.

FIG. 6 illustrates a schematic construction of a 3D image display apparatus 200 according to another example embodiment and optical paths in which multi-view images are created.

The 3D image display apparatus 200 according to another example embodiment differs from the 3D image display apparatus 100 of FIG. 1 in the arrangement of the active optical device 150 and the varifocal lens 130. That is, referring to FIG. 6, the active optical device 150 is disposed between the image generating unit 110 and the varifocal lens 130. The active optical device 150 and the varifocal lens 130 may have the same structures as described with reference to FIGS. 2A through 5.

According to teachings above, an image generating unit creates images that have different viewpoints and that will be provided to multiple viewpoints located along a first direction parallel to the image generating unit. The images having different viewpoints are provided to the multiple viewpoints corresponding thereto. The viewpoints are vertically adjusted so as to vary positions at which the images having different viewpoints are focused along a second direction away from the image generating unit. The 3D image display apparatus 100 is presented as an example embodiment that may perform the 3D image display method.

According to the teachings above, there is provided 3D image display apparatuses and methods that employ an active optical device which may create multi-views in a horizontal direction and a varifocal lens that may change a focal position in a distance direction so as to increase a range of a viewing zone where 3D images may be viewed.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three-dimensional (3D) image display apparatus, comprising:
   an image generator configured to time sequentially generate two-dimensional (2D) multi-view images having different viewpoints respectively corresponding to multiple viewpoints;
   an active optical device configured to time sequentially change a propagation path of light containing the generated 2D images to provide the generated 2D images to the corresponding multiple viewpoints that are located along a first direction parallel to the image generator; and
   a varifocal lens configured to vary a focal position of the generated 2D images along a second direction away from the image generator,
   wherein the active optical device is further configured to be adjustable so as to refract light containing the generated 2D images having different viewpoints at angles respectively corresponding to the different viewpoints, and driven in synchronization with the image generator,
   wherein the generated 2D multi-view images having different viewpoints are respectively time sequentially provided to a viewer so that the viewer perceives a three-dimensional image with one eye, in accordance with the time sequential changing of the active optical device.

2. The apparatus of claim 1, wherein the varifocal lens is disposed between the image generator and the active optical device.

3. The apparatus of claim 1, wherein the active optical device is disposed between the image generator and the varifocal lens.

4. The apparatus of claim 1, wherein the active optical device includes an electrowetting prism having a refracting surface whose slope changes according to application of a voltage.

5. The apparatus of claim 1, wherein the active optical device comprises an optical plate configured to control a direction in which light is refracted according to a rotation angle of the optical plate.

6. The apparatus of claim 5, wherein the rotation angle of the optical plate is adjusted in an electro-mechanical manner.

7. The apparatus of claim 1, wherein the varifocal lens comprises a liquid lens configured to control a shape of a lens surface according to electrical control.

8. The apparatus of claim 1, wherein the varifocal lens comprises an optical lens configured to perform parallel movement along the second direction.

9. The apparatus of claim 1, wherein the image generator comprises one of a Liquid Crystal Display (LCD), a Ferroelectric Liquid Crystal Display (FLCD), a Digital Micromirror Device (DMD), a Liquid Crystal on Silicon (LCOS), a Spatial Light Modulator (SLM), a Plasma Display Panel (PDP), a Cathode Ray Tube (CRT), a Light Emitting Diode (LED), and an Organic Light Emitting Diode (OLED).

10. The apparatus of claim 1, further comprising an eye-tracking sensor configured to detect a viewing position.

11. The apparatus of claim 10, wherein the varifocal lens is further configured to vary the focal position according to the detected viewing position.

12. A three-dimensional (3D) display method, comprising:
   generating, in an image generator, and in a time sequential manner, a plurality of two-dimensional (2D) multi-view images having different viewpoints to be provided to multiple viewpoints located along a first direction parallel to the image generator;
   time sequentially providing the generated 2D images having different viewpoints to the multiple viewpoints corresponding thereto; and
   adjusting focal positions of the generated 2D images along a second direction away from the image generator,
   wherein the providing of the generated 2D images comprises time sequentially adjustably refracting light containing the generated 2D images having different viewpoints at angles respectively corresponding to the different viewpoints, in synchronization with the image generator so that the generated 2D multi-view images having different viewpoints are provided to a viewer so that the viewer perceives a three-dimensional image with one eye, in accordance with the time-sequential refraction.

13. The method of claim 12, wherein the refracting of the light comprises changing a slope of a refracting surface of an electrowetting prism according to application of a voltage.

14. The method of claim 12, wherein the refracting of the light comprises controlling a direction in which the light is refracted using an optical plate, the controlling of the light refracting direction comprising adjusting a rotation angle of the optical plate.

15. The method of claim 12, wherein the adjusting of the focal positions comprises controlling a shape of a lens surface with a liquid lens according to electrical control.

16. The method of claim 12, wherein the adjusting of the focal positions comprises performing parallel movement with an optical lens along the second direction.

17. The method of claim 12, wherein the adjusting of the focal positions comprises:
    detecting a viewing position via eye-tracking; and
    controlling the focal positions according to the detected viewing position.

* * * * *